United States Patent [19]
Pugin

[11] 3,923,730
[45] Dec. 2, 1975

[54] WEATHER-RESISTANT PIGMENTED METALLIC ACRYLIC RESIN LACQUER
[75] Inventor: Andre Pugin, Riehen, Switzerland
[73] Assignee: Ciba-Geigy Corporation, Ardsley, N.Y.
[22] Filed: Feb. 19, 1974
[21] Appl. No.: 443,267

[30] Foreign Application Priority Data
Feb. 28, 1973 Switzerland.......................... 2918/73

[52] U.S. Cl........ 260/42.21; 260/17 R; 260/31.8 R; 260/32.8 R; 260/33.4 R; 260/33.6 UA; 260/39 P; 260/42.22; 260/314.5
[51] Int. Cl.$^2$....................... C08K 3/08; C08K 5/34
[58] Field of Search....................... 260/42.21, 314.5

[56] References Cited
UNITED STATES PATENTS
3,781,379    12/1973    Theodore............................ 260/836

OTHER PUBLICATIONS

Kirk–Othmer, Encyclopedia of Chemical Technology, 2nd Edition, Vol. 15, 1968, John Wiley & Sons, Inc., p. 488.

Karmitz; Pierre, A Contribution to the Study of Rubber Protection Against Atmospheric Agents in R.G.C., Vol. 35, 1958, pp. 1243–1251.

The Condensed Chemical Dictionary, 6th Ed., Reinhold Pub. Corp., New York, 1961, p. 49.

*Primary Examiner*—James H. Derrington
*Attorney, Agent, or Firm*—Vincent J. Cavalieri; Nestor W. Shust

[57] ABSTRACT

Weather-resistant pigmented metallic acrylic resin lacquer containing nickel-phthalocyanine pigment, aluminium and an acrylic resin.

2 Claims, No Drawings

WEATHER-RESISTANT PIGMENTED METALLIC ACRYLIC RESIN LACQUER

In manufacturing metallic thermoplastic or thermosetting acrylic resins it has been found that the copper-phthalocyanine used as the pigment in combination with aluminium bronze displays inadequate weather resistance so that it has been necessary to employ other pigments, which are weather-resistant but have a less advantageous colour shade than the phthalocyanines.

The subject of the present invention is now a weather-resistant pigmented metallic acrylic resin lacquer containing a phthalocyanine pigment, aluminium and an acrylic resin, characterised in that it contains nickel-phthalocyanine as the phthalocyanine pigment.

The different weather resistance of nickel-phthalocyanine as compared to the previously used copper-phthalocyanine in acrylic resin lacquers must be regarded as surprising since the pigment properties of the metal pthalocyanines mentioned were regarded as practically equivalent.

The ratio of the amounts of nickel-phthalocyanine to aluminium depends on the desired effect and is suitably between 5:95 and 95:5 % by weight. Relative to the lacquer mixture, the pigment content is preferably 0.1–5% by weight but can also be higher or lower.

The nickel-phthalocyanine can be used both in the α-form and in the β-form. In addition, the nickel-phthalocyanine can be stabilised, for example by chlorination, by chloromethylation and subsequent amination, or by sulphonation. Furthermore, the nickel-phthalocyanine can have been stabilised against flocculation and recrystallisation by using a mixed synthesis from phthalic acid, pryidinedicarboxylic acid, chlorophthalic acid and/or sulphophthalic acid.

The aluminium is advantageously used in the form of an aluminium paste, for example containing 65% by weight of metal. A suitable procedure is to add the aluminium paste and the nickel-phthalocyanine to a solvent, for example aromatic hydrocarbons, ketones or ethyl acetate or their mixtures, and to mix therein by stirring. The binder constituents are then added gradually, and this is followed by another stirring process.

Polymers of acrylic acid, acrylic esters, methacrylic esters and acrylonitrile are suitable for the manufacture of the acrylic resin lacquer and the polymers can be both thermosetting and thermoplastic resins. Other resins, such as melamine resin, or cellulose acetates, such as cellulose acetobutyrate, or plasticisers, such as butyl benzyl phthalate, can be added as further components.

The acrylic resin lacquers according to the invention are in the main used in the automobile industry for the production of metallic pigment lacquers (car finishes). However, the pigmented lacquer according to the invention can also be employed with advantage wherever a weather-resistant acrylic resin lacquer giving a so-called metallic effect is required. In addition to the better weather resistance as compared to acrylic resin lacquers containing copper-phthalocyanine, the acrylic resin lacquer pigmented with nickel-phthalocyanine also has the advantage of a different colour shade and a different so-called flip-flop effect. This means that the nickel-phthalocyanine contained in the lacquer causes different reflection appearances from those produced by copper-phthalocyanine when the angle of viewing the lacquer-coated surface is changed.

A. Formulation of metallic-effect lacquers in thermoplastic acrylic lacquer (TPA)

EXAMPLE 1.

0.5 part by weight of nickel-phthalocyanine (20% α-form and 80% β-form), produced by grinding crude nickel-phthalocyanine with salt in the presence of small amounts of N-diethylaniline, and 2 parts by weight of Alcoa 726, an aluminium paste from Aluminium Company of America, containing 65% by weight of metal, are steeped in 13.2 parts by weight of methyl ethyl ketone and 25 parts by weight of toluene and the mixture is kept overnight and stirred for 2 hours on the next day. 36 parts by weight of Elvacite 6011, a non-crosslinking polymethyacrylate in the form of a 40% strength by weight solution in toluene/acetone, 7:3, from E. I. du Pont de Nemours, 16.5 parts by weight of EAB 381.2, a 20% strength by weight solution of a cellulose acetobutyrate in ethylglycol acetate from Eastman Chemical Products, and 6.8 parts by weight of butyl benzyl phthalate as the plasticiser, are then added gradually. Finally, the mixture is stirred for 30 minutes. A lacquer is obtained, which after spraying onto sheet metal and warming to 120°C gives blue-grey metallic colourations with better weather resistance than if an analogously prepared and applied copper-phthalocyanine is used.

EXAMPLE 2

Instead of the nickel-phthalocyanine from Example 1, a mixture of 0.5 part by weight of bis-tetrachloroisoindol-inonyl-p-phenylenediamine and 1 part by weight of nickel-phthalocyanine (100% β-form) is used together with 1.5 parts by weight of Alcoa 726, and is processed further as in Example 1. This mixture gives green metallic colourations of excellent weather resistance.

EXAMPLE 3

1.5 parts by weight of a nickel-phthalocyanine which is prepared by mixed synthesis from 2.8 mols of phthalic anhydride, 0.5 mol of pyridine-2,3-dicarboxylic acid, 0.5 mol of 4-chlorophthalic anhydride, 0.2 mol of 4-sulphophthalic acid and 1.2 mols of nickel chloride, urea and ammonium molybdate as the catalyst, in nitrobenzene, are used as the pigment and are further processed with 1.5 parts by weight of Alcoa 726 as in Example 1. This mixture gives blue metallic colourations of excellent weather resistance.

B. Formulation of metallic-effect lacquers in a thermosetting acrylic system (TSA)

EXAMPLE 4

0.5 part by weight of nickel-phthalocyanine (20% α-form and 80% β-form), prepared by grinding crude nickel-phthalocyanine with salt in the presence of small amounts of N-diethylaniline, and 2 parts by weight of Alcoa 726, are steeped in 9.5 parts by weight of a mixture of xylene and toluene, 1:1, 1 part by weight of methyl isobutyl ketone and 1 part by weight of butyl acetate and the mixture is kept overnight and stirred for 2 hours on the next day. Thereafter, 58 parts by weight of Baycryl L 530, a thermosetting polyacrylate requiring an external crosslinking agent, as a 53% strength by weight solution in xylene/butanol, 3:1, from Bayer AG Leverkusen, and 28 parts by weight of Maprenal TTX, a 55% strength by weight solution of a melamine resin in butanol, from Cassella Farbwerke AG, are added gradually. Finally, the mixture is stirred for 30 minutes. When the lacquer produced in this way is sprayed onto sheet metal and stoved at 120°–130°C, blue-grey metallic colourations are obtained, which have better weather resistance than when copper-phthalocyanine prepared analogously is used in this lacquer.

EXAMPLE 5

Instead of Baycryl L 530, the same amount of Epok D 2104, an hydroxyacrylic acid ester copolymer requiring an external crosslinking agent, as a 60% strength by weight solution in xylene/butanol, 1:1, from BP Chemicals International, is used as is further processed in the same manner.

EXAMPLE 6

The pigment used consists of 1.5 parts by weight of nickel-phthalocyanine (100% β-form), which is prepared as in Example 4 and subsequently treated by boiling in isopropyl alcohol, together with 1.5 parts by weight of Alcoa 726, instead of the combination indicated in Example 4, and is further processed as in Example 4. It gives blue metallic colourations of excellent weather resistance.

EXAMPLE 7

The pigment used consists of 1.5 parts by weight of a chlorinated nickel-phthalocyanine (100% α-form) containing 3.6% by weight of chlorine and prepared from phthalonitrile and nickel chloride, together with 2 parts by weight of Alcoa 726, instead of the combination indicated in Example 4, and is further processed as in Example 4.

EXAMPLE 8

The pigment used consists of 3.2 parts by weight of nickel-phthalocyanine (20% α-form and 80% β-form), which is prepared as in Example 4, together with 0.8 part by weight of Alcoa 726, instead of the combination indicated in Example 4, and is further processed as in Example 4. It gives deep blue metallic colourations of outstanding weather resistance.

I claim:

1. Weather-resistant pigmented metallic acrylic resin lacquer containing a phthalocyanine pigment, aluminium and an acrylic resin, characterised in that it contains nickel-phthalocyanine as the phthalocyanine pigment wherein the ratio of nickel-phthalocyanine to aluminum is between 5:95 and 95:5% by weight.

2. A process for improving the weather-resistance of a pigmented acrylic metallic resin lacquer containing a phthalocyanine pigment, aluminum, and an acrylic resin which comprises incorporating into said pigmented metallic acrylic resin lacquer nickel-phthalocyanine as the phthalocyanine pigment wherein the ratio of nickel-phthalocyanine to aluminum is between 5:95 and 95:5% by weight.

* * * * *